July 24, 1923.
A. RICK
AUTOMOBILE TRAFFIC SIGNAL
Filed Feb. 16, 1922
1,462,659
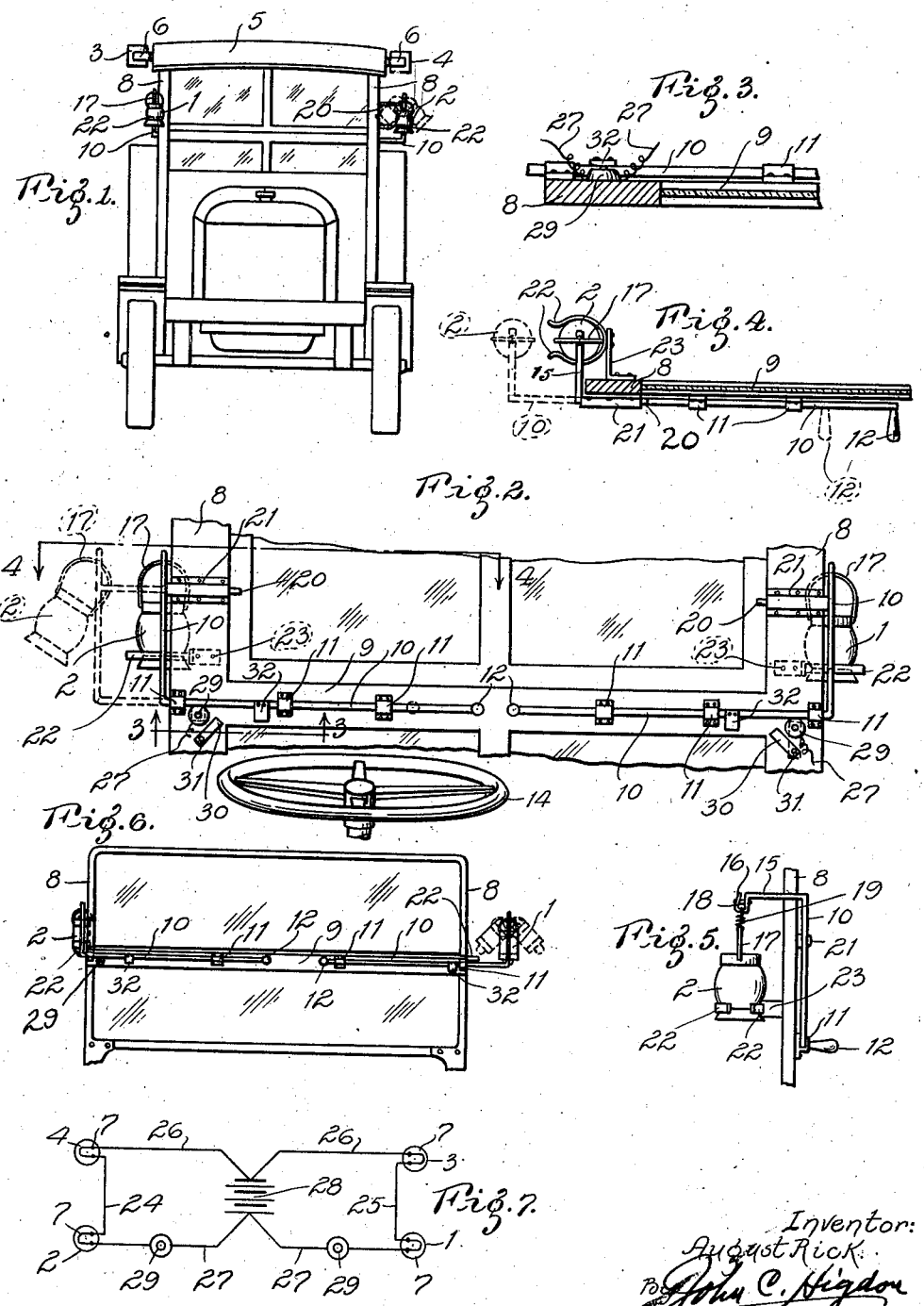
Inventor:
August Rick
By John C. Higdon
Attorney.

Patented July 24, 1923.

1,462,659

UNITED STATES PATENT OFFICE.

AUGUST RICK, OF ST. LOUIS, MISSOURI.

AUTOMOBILE TRAFFIC SIGNAL.

Application filed February 16, 1922. Serial No. 536,954.

*To all whom it may concern:*

Be it known that I, AUGUST RICK, a citizen of the United States, residing at St. Louis, in the State of Missouri, have invented certain new and useful Improvements in Automobile Traffic Signals, of which the following is a specification, containing a full, clear, and exact description, reference being had to the accompanying drawing, forming a part hereof.

My invention consists in the novel disclosure hereinafter particularly described and distinctly claimed.

The object of my invention is to provide an improved automobile traffic-signal, for both the front and rear of trucks and passenger cars; which shall be simple in construction and operation, and of corresponding low cost of manufacture and upkeep; whereby the drivers of trucks, passenger automobiles and other vehicles, as well as the traffic officers, pedestrians and other persons, at a distance from the truck or passenger car carrying my invention, will be quickly and effectually informed of the driver's intention to turn to the right or left, or to stop the automobile which carries my invention.

In the drawings,

Fig. 1 is a front-elevation of an automobile truck that has a driver's cab, to which my invention has been applied.

Fig. 2 an enlarged fragmentary elevation of the interior of the driver's cab, having my invention applied to the same, and looking towards the front; showing the rear side of the wind-shield.

Fig. 3 is a detail horizontal section through one side of the wind-shield frame, taken on the line 3—3 of Fig. 2, and looking in the direction indicated by the arrows.

Fig. 4 is a detail horizontal section through one side of the wind-shield frame, taken on the line 4—4 of Fig. 2, and looking in the direction indicated by the arrows at the ends of said line.

Fig. 5 is a detail view showing a modified form of signal-lamp.

Fig. 6 is an inside, or rear, elevation of a modified form of wind-shield,—a passenger-automobile wind-shield, having my invention applied thereto, and Fig. 7 is a diagram of the electrical connections, when electric-lamps are used.

An important feature of my invention is the "swinging" of the front right and left lamps or lanterns, laterally back and forth, in a manner similar to that in which a railroad switchman swings his hand-lantern laterally back and forth, in signaling upon a railway line, as it will be readily understood and appreciated that a swinging (or laterally moving) lighted lamp or lantern will attract attention more quickly than one that is held stationary.

In the present form of my invention, I have shown at the front of the driver's cab of a truck, in Fig. 1, and at the opposite sides of the windshield, in Fig. 6, two swinging lamps or lanterns, one of which I designate by the numeral 1 as the right-hand lamp, while the other is the left-hand lamp, designated by the numeral 2.

Only the front side-lamps are mounted to swing in the present illustration of the invention; and they are not only adapted to swing back and forth, in signaling, but they are arranged to be first moved from a normal stationary position, in front of the driver's cab, or in front of the windshield, outwardly a considerable distance, so they will be free of the cab-front or windshield, to a more conspicuous position, where they will be more readily seen, both from the front and rear, and then they are swung laterally or back and forth, as desired, in order to attract greater attention, in signaling.

The two rear lights or lamps 3 and 4, are of the common form, attached to the rear portion of the automobile-top 5 (in the present case) by means of the usual brackets 6, and each lamp contains a lighting-means, such as a kerosene-lamp, or an electric bulb having the usual filament 7.

In the present case, the said rear lamps 3 and 4, do not swing, but are held immovable by their brackets 6; but it will be understood that the said rear lamps may also be mounted to swing back and forth, by the means used to mount the swinging front lamps 1 and 2, which will now be described in detail.

The numeral 8 designates the front-frame of the truck-cab, when the invention is to be applied to a truck, as shown in Figs. 1 to 5 inclusive, or the frame of the windshield when the devices are to be used upon a passenger automobile or vehicle, as illustrated in Fig. 6.

Right-hand and left-hand separate sliding lamp-brackets 10, which (in the present case) are substantially L-shaped when viewed from the rear of the windshield, have their horizontal arms mounted loosely to slide in common bearings or brackets 11, fixed to the rear side of said cross-bar 9 with screws or nails.

A handle 12 is formed integral with, or attached to, the inner end of the horizontal arm of each of the said L-shaped sliding lamp-brackets 10, and projects rearwardly therefrom, convenient for the driver, while he or she is seated in rear of the steering-wheel 14.

The vertical arm of the said L-shaped sliding lamp-brackets has a short integral forwardly-extending supporting-arm 15 at its upper end. Fig. 5.

A hook 16 is provided at the front end of the said supporting-arms 15, and lampbail (or handle) 17 is detachably mounted in and supported by the said hook.

A pin or bolt 18 is passed through apertures in said hook, above said lamp-bail or handle 17, to prevent accidental displacement of the latter, by the bouncing of the automobile when passing over rough roads.

If desired, particularly if oil-lamps are used, the bail 17 of the lamp may be yieldingly supported by said hook by interposing a coiled-spring 19 between said bail and said hook, as shown in Fig. 5. This spring will be useful, and should be provided, to prevent the extinguishment of the flame by sudden "bumps" upon rough roads, when oil-lamps are used.

To more securely hold the vertical-arms of said sliding L-shaped brackets 10 in an upright position during use, I provide each of said vertical arms with a short horizontal sliding brace-arm 20, which is formed integral with or attached to said vertical arms at a point near to the upper ends of the latter, and projects inwardly parallel with the main (or horizontal) arm of each of said sliding lamp-brackets 10.

Each of said brace-arms 20 is mounted to slide in a bearing 21 fixed on the rear side of the front or wind-shield frame 8, so that when said vertical arms of said sliding L-shaped lamp-brackets, will be supported in a vertical position at all times, whether in normal retracted position, or when projected, to the position indicated by the dotted lines, at the left-hand of Fig. 2.

Of course, as will be readily seen, the said brace-arms 20 may be omitted in some cases, and the said vertical arms of the L-shaped sliding lamp-brackets 10 will still remain (and be supported) in a vertical position at all times, by making the said horizontal-arms of said L-shaped sliding brackets rectangular in cross-section, or otherwise non-circular in cross-section, and making the internal cross-section of their said bearings 11 non-circular, to fit said non-circular horizontal-arms. In fact the non-circular form of said parts is preferred at all times, and it is shown in the drawing, particularly at 11 in Fig. 5.

In the modified construction shown in Fig. 6, said brace-arms 20 have been omitted, as unnecessary, as well as to avoid complications on the passenger-car windshield frame 8.

To normally hold the front lamps 1 and 2 against swinging, the bodies of same are held detachably between flat springs or yielding lamp-holders, 22, which are U-shaped in plan-view, and have their outer ends free, and separated a distance, so that the lamp-body can be readily made to force them apart, and be pushed between them, and rest and be held against swinging, until said lamp-body is thrown to the swinging position, indicated by the dotted lines in several figures of the drawing, which is permitted by said lamp-holders yielding, and being forced apart sufficiently to release said lamp-body, by grasping the handle 12 of the L-shaped sliding lamp-bracket which carries said lamp-body, and sliding same to a signaling and swinging position, in which it is shown in solid lines in Figs. 1 and 6 (at the right-hand of said figures), and in dotted lines at the left-hand of Fig. 2.

Said yielding lamp-holding arms, or spring lamp-holders 22, are supported in a horizontal position by L-shaped brackets 23 fixed in position upon the face of the said front frame 8 of the automobile cab. Fig. 4.

*The electrical connections.*

When electric-lamps are used, the wiring is preferably that shown in Fig. 7, wherein the lamp-filaments 7 of the front lamp 2 is connected to the filament of the rear lamp 4 by means of a wire 24; and the lamp-filaments 7 of the front lamp 1 and the rear lamp 3, upon the opposite side of the automobile, are connected by a conducting-wire 25.

Additional wires 26 and 27 connect the filaments 7 to a suitable battery or other source of current 28.

Push-buttons, or switches, 29, are fixed upon the rear side of the cab-front or other convenient part of the automobile, and connected by means of wire 27 with the appropriate front and rear filaments, whereby the same may be simultaneously lighted on one side of the automobile, to indicate a turn in one direction, or the front and rear lamps on the opposite side of the automobile may be simultaneously lighted, by pressing the other push-button, to indicate a turn in the opposite direction.

These push-buttons or switches 29 may, of course, be operated in the usual manner, by hand, either before the lamps 1 and 2 are thrown out to a swinging position, or afterward, as desired; but the preferred arrangement is to automatically light the said lamps by causing a push-button operating-lug 32 on the horizontal-arm of the said sliding lamp-brackets 10 to slide onto and press the push-buttons, and hold same in contact position, whenever said lamp-brackets are thrown outwardly. See Figs. 2 and 3.

By the construction and operation just described, the lamps on one side of the automobile, both front and rear, will be lighted simultaneously with the throwing of the side lamp on that side to a signaling and swinging position.

The exposed heads of said push-buttons 29 are rounded, as usual, so that there will be no difficulty in sliding said operating-lugs 32 onto the said heads; and to still further facilitate the action, the outer edge of said lugs may be beveled, rounded, or inclined, as shown in Fig. 3.

In parking the automobile, the lights may be left lighted as long as desired, by pushing the buttons with the finger, while the front lamps 1 and 2 (or either of them) are in a retracted position, and securing the heads of the buttons in a retracted position by means of holding-lugs or plates 30, which are pivoted at 31 to the said frame 8, beneath or near to said push-buttons 29. Fig. 2.

The operation.

The operation of my invention will be readily understood from the above description, but I will add thereto by stating that the mere act of shoving or sliding outwardly the said sliding lamp-brackets 10, and stopping the movement suddenly by bringing the said push-button operating-lug 32 into contact with the outer bearing 11, the front suspended (or pivotally mounted) lamp that is carried by said suddenly stopped bracket 10, will be thrown outwardly, to the position shown by the dotted lines at the left-hand of Fig. 2; and then, after said outward movement ceases, the said pivotally-mounted lamp will automatically swing inwardly, and thence outwardly again, similar to the vibrations of a pendulum, as shown by dotted lines at the right-hand of Figs. 1 and 6.

Swinging the lamps 1 and 2 back and forth, as just described, will produce a striking and highly efficient signal, which could not well be missed or ignored by an observer.

I do not limit myself to the exact construction and function herein described, as the same may be readily changed by skilled mechanics, and still accomplish the same result, without departing from the scope of my claim.

I claim:—

A traffic signal-lamp having a suspending-bail, and suspended from said bail to swing freely back and forth; in combination with a sliding lamp-bracket from which said bail is suspended, and means by which said bracket is moved, to cause said lamp to swing back and forth, in signaling with the same.

In testimony whereof, I have signed my name to this specification in presence of two subscribing witnesses.

AUGUST RICK.

Witnesses:
 JOHN C. HIGDON,
 HENRY L. HIGDON.